United States Patent
Baumbick

[11] Patent Number: 6,151,897
[45] Date of Patent: Nov. 28, 2000

[54] SHAPE MEMORY ALLOY ACTUATOR

[75] Inventor: Robert J. Baumbick, North Ridgeville, Ohio

[73] Assignee: The United States of America as represented by the Administrator of the National Aeronautics and Space Administration, Washington, D.C.

[21] Appl. No.: 09/286,877

[22] Filed: Apr. 6, 1999

[51] Int. Cl.[7] .................................................. F01B 29/10
[52] U.S. Cl. ........................ 60/527; 137/625.62; 251/11
[58] Field of Search ................... 60/527; 137/625.62; 251/11

[56] References Cited

U.S. PATENT DOCUMENTS

| 4,041,706 | 8/1977 | White ........................................... 60/527 |
| 4,538,633 | 9/1985 | Stevens ............................ 137/625.62 X |
| 4,597,632 | 7/1986 | Mallinson . |
| 4,660,589 | 4/1987 | Bartholomew ......................... 251/11 X |
| 4,700,541 | 10/1987 | Gabriel . |
| 4,832,444 | 5/1989 | Takahashi . |
| 4,841,730 | 6/1989 | McDonald ................................ 60/527 |
| 4,899,543 | 2/1990 | Romanelli . |
| 4,984,542 | 1/1991 | Rishe . |
| 4,987,314 | 1/1991 | Gotanda . |
| 4,989,946 | 2/1991 | Williams . |
| 5,004,318 | 4/1991 | Ohashi . |
| 5,024,497 | 6/1991 | Jebens . |
| 5,035,530 | 7/1991 | Fukuda . |
| 5,061,914 | 10/1991 | Busch . |
| 5,188,728 | 2/1993 | Traonvoez . |
| 5,271,075 | 12/1993 | Gfeller . |
| 5,279,123 | 1/1994 | Wechsler et al. ......................... 60/527 |
| 5,410,290 | 4/1995 | Cho . |
| 5,769,389 | 6/1998 | Jacobsen . |

FOREIGN PATENT DOCUMENTS

| 62-7980 | 1/1987 | Japan ..................................... 60/527 |

*Primary Examiner*—Gerald A. Michalsky
*Attorney, Agent, or Firm*—Kent N. Stone

[57] ABSTRACT

The present invention discloses and teaches a unique, remote optically controlled micro actuator particularly suitable for aerospace vehicle applications wherein hot gas, or in the alternative optical energy, is employed as the medium by which shape memory alloy elements are activated. In gas turbine powered aircraft the source of the hot gas may be the turbine engine compressor or turbine sections.

4 Claims, 4 Drawing Sheets

SHAPE MEMORY ALLOY ACTUATOR

ORIGIN OF THE INVENTION

The invention described herein was made by an employee of the United States Government and may be manufactured and used by or for the Government for Government purposes without the payment of any royalties thereon or therefor.

BACKGROUND OF THE INVENTION

1. Field of the Invention

The present invention relates to a microactuator control apparatus using shape memory alloy (SMA) elements activated by the application of thermal energy, either from a high temperature gas or an optical sources.

2. Description of the Related Art

Shape memory alloys, such as the well known nickel-titanium type, exhibit novel properties in which they exhibit the ability to return to a predetermined shape when heated. When a SMA is cold, or below its transformation temperature, it exhibits very low yield strength and can be deformed quite easily into any desired shape which it will retain. However, when heated above its transformation temperature it will undergo a change in crystal structure which causes it to return to its original shape. In the event the SMA encounters any resistance during this transformation, it can exert extremely large forces upon the resisting media.

Thus SMA materials have proven to be invaluable for remote actuation devices. Although many uses of SMA materials have been heretofore disclosed as actuator devices these prior art devices generally employ electrical energy as their means for activating the SMA elements. For example see U.S. Pat. Nos. 5,769,389; 5,410,290; 5,271,075; 5,024,497; 5,004,318; and 4,987,314. However, using the SMA material itself to produce resistance heating is not desirable as SMA materials exhibit low electrical resistance thereby requiring higher current flow than other more suitable resistance heating elements.

BRIEF SUMMARY OF THE INVENTION

The present invention teaches a SMA microactuator device useful for the operation of a servo valve in an aircraft control system and/or any other suitable aerospace or non-aerospace application. The present SMA actuator, as disclosed herein, is unique in that it may employ the use of thermal energy from either a hot gas source or from an optical power source to activate the SMA elements, In the hot gas embodiment the flow of hot gas, to the SMA elements, is preferably controlled by optically operated switches or gates. In the optical energy embodiment optical energy, such as laser energy, may be applied directly to the SMA elements using known optical energy transmission means. Thus it is unnecessary to provide a source of electrical energy for operation of the microactuator. The hot gas and/or optically operated SMA actuators, as taught herein, are particularly suitable for use on gas turbine powered aircraft where a ready and abundant supply of high temperature gas is available from the compressor and/or turbine section of the gas turbine engine. However, one skilled in the art may find other suitable applications for SMA actuators as taught herein.

DETAILED DESCRIPTION OF THE INVENTION

Figure 1:
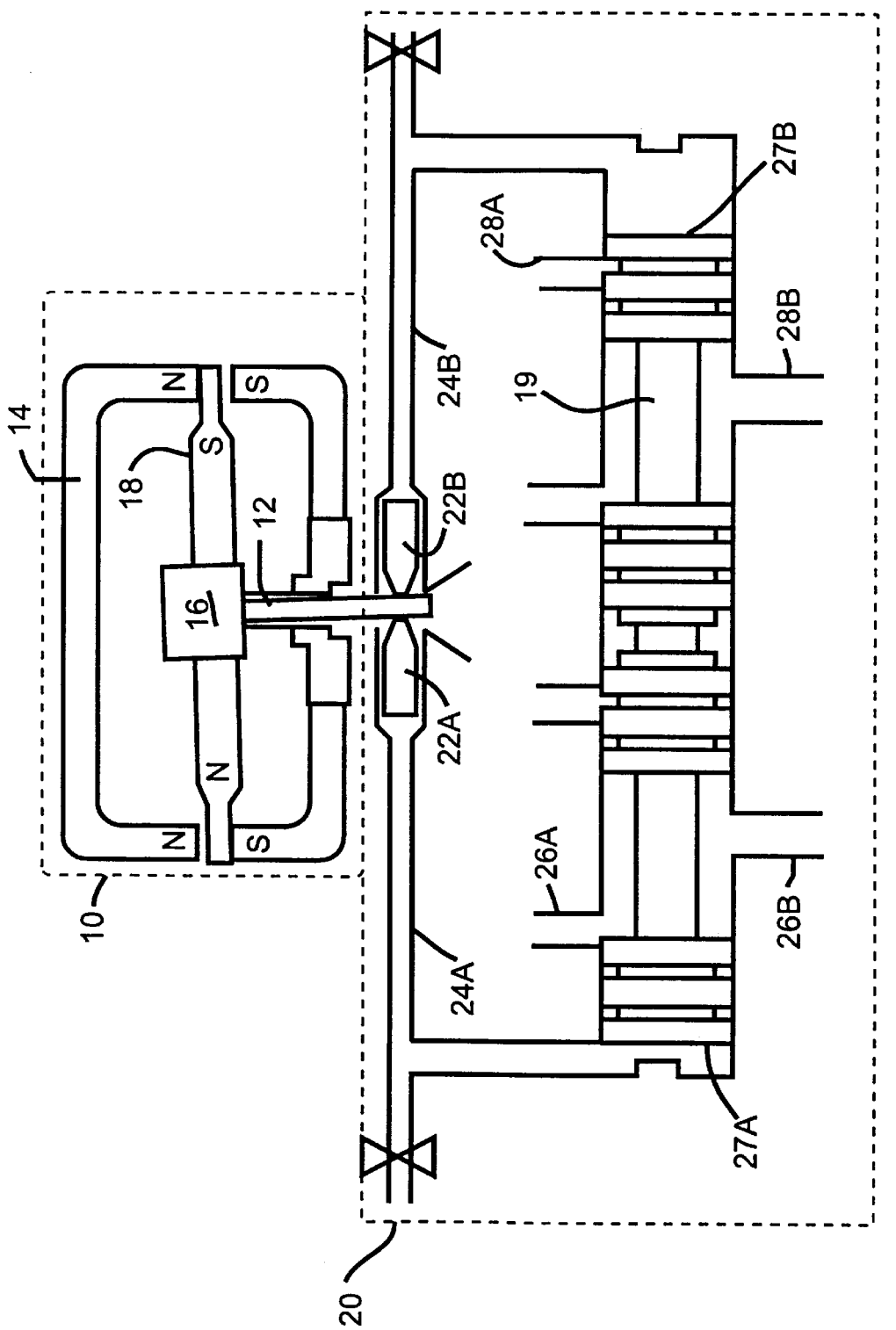
FIG. 1 presents a schematic illustration of a typical prior art electromechanically operated servo valve.

FIG. 1 presents a schematic of a typical prior art servo valve operated by electrical energy. The servo valve typically comprises an electromechanical device 10 and a fluidic control device 20. As illustrated in FIG. 1 the servo valve is shown in a configuration whereby spool 19 has been caused to shift to the left as viewed in the figure.

Electromechanical device 10 is provided to operate flapper arm 12. Device 10 generally comprises a permanent magnet 14 having north and south poles as illustrated. Electromagnet 16 is provided to control the polarity of rocker arm 18. Thus depending upon the polarity of rocker arm 18, the rocker arm may be caused to rotate clockwise or counter clockwise as desired. As rocker arm 18 rotates clockwise or counter clockwise, flapper arm 12 is likewise caused to move left or right, as viewed in FIG. 1. As flapper arm 12 moves left or right, spool 19 of servo control valve 20 is actuated as further described below.

Now referring to servo control valve 20, without any force applied to flapper arm 12, arm 12 remains equally distant between jet pipes 22A and 22B thereby causing equal flow from each said jet pipe. Thus the pressure applied to faces 27A and 27B of spool 19 is equal thereby maintaining spool 19 in a neutral position (not shown). In such neutral position fluid flow between conduits 26A and 26B, and between 28A and 28B will not occur. However, when flapper arm 12 is caused to rotate to the right from its neutral position (as viewed in FIG. 1), the flow from jet pipe 22B is restricted. Thus, the fluidic pressure within pipe 24B is caused to increase thereby applying a higher fluidic force on face 27B than on 27A of spool 19. Because of the differential forces acting upon spool 19, spool 19 will shuttle to the left (as illustrated in FIG. 1) whereby ports 26A and 26B will be opened to one another.

Similarly if it is desired to open ports 28A and 28b to one another the flapper arm 12 is caused to rotate left thereby reversing the differential forces acting upon spool 19 whereby spool 19 will move right thereby opening fluidic communication between ports 28A and 28B while fluidic communication between ports 26A and 26B will be closed. The selective opening and closing of ports 26A and 28A may be used to provide many apparatus control functions such as wing flap and/or landing gear deployment on aircraft.

Figure 2:
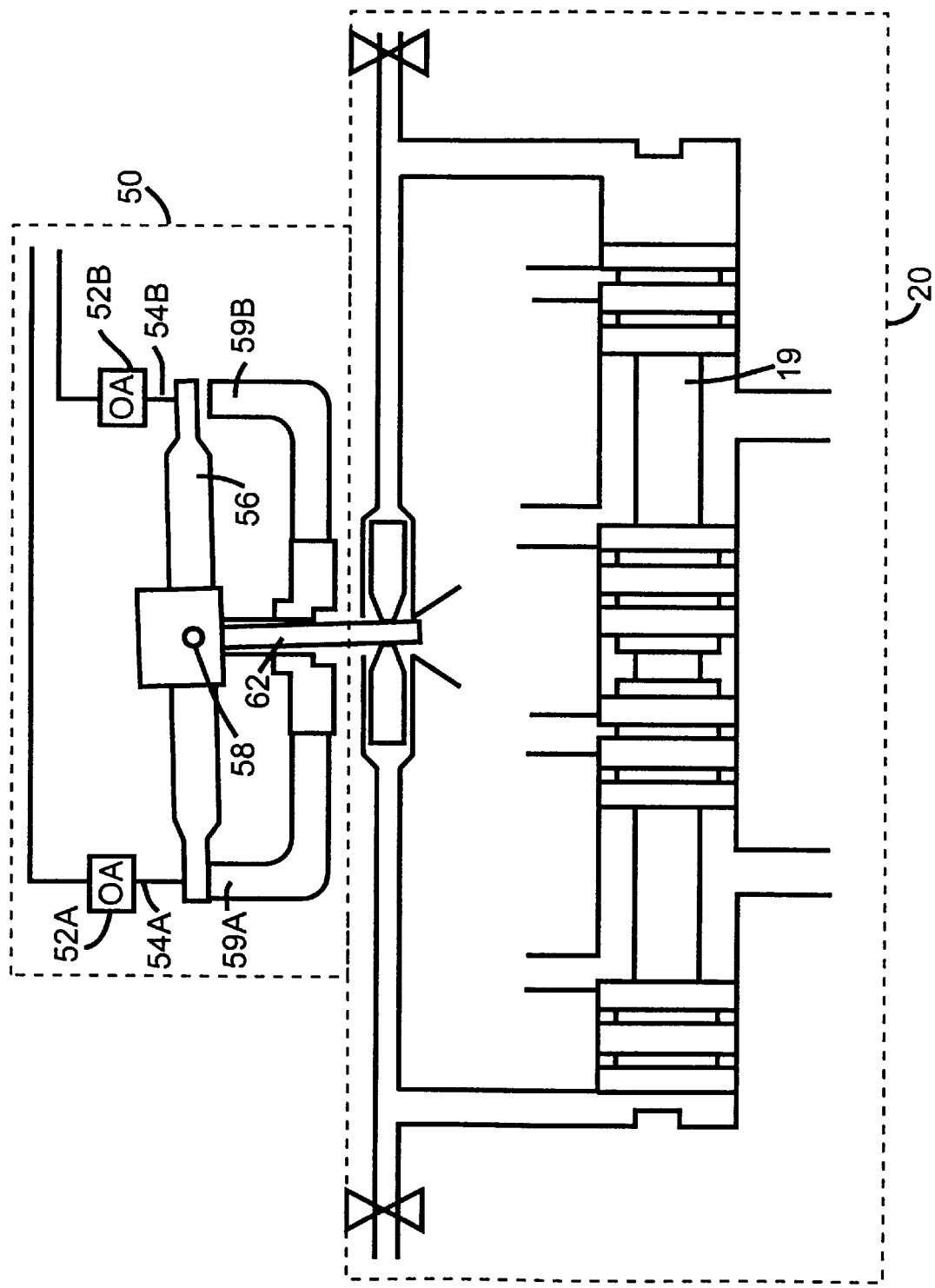
FIG. 2 presents a schematic illustration of the prior art servo valve, as illustrated in FIG. 1, converted to operation by my new and novel optically controlled SMA actuator.

Now referring to FIG. 2 an optically controlled device 50 is shown replacing the electromagnetic device 10 of the prior art in FIG. 1. The permanent and electromagnets have been replaced by optical actuators 52A and 52B. The function of optical actuators 52A and 52B will be further described in detail below.

Extending from each optical actuator 52A and 52B is an actuator ram 54A and 54B. Actuator rams 54A and 54B act upon associated arms of rocker arm 56 causing rocker arm 56 to pivot about pivot 58. Extending from and attached to rocker arm 56 is flapper arm 62 similar to arm 12 in FIG. 1. Optical actuators 52 selectively cause rocker arm 56 to rotate clockwise or counter clockwise as desired by action of the actuator ram moving downward, as viewed in FIG. 2, against the outer end of rocker arm 56 whereby rocker arm 56 is forced against rocker arm limit stops 59A or 59B. Thus flapper arm 62 functions similar to flapper 12 arm of the prior art thereby causing translation of spool as described above.

Figure 3:
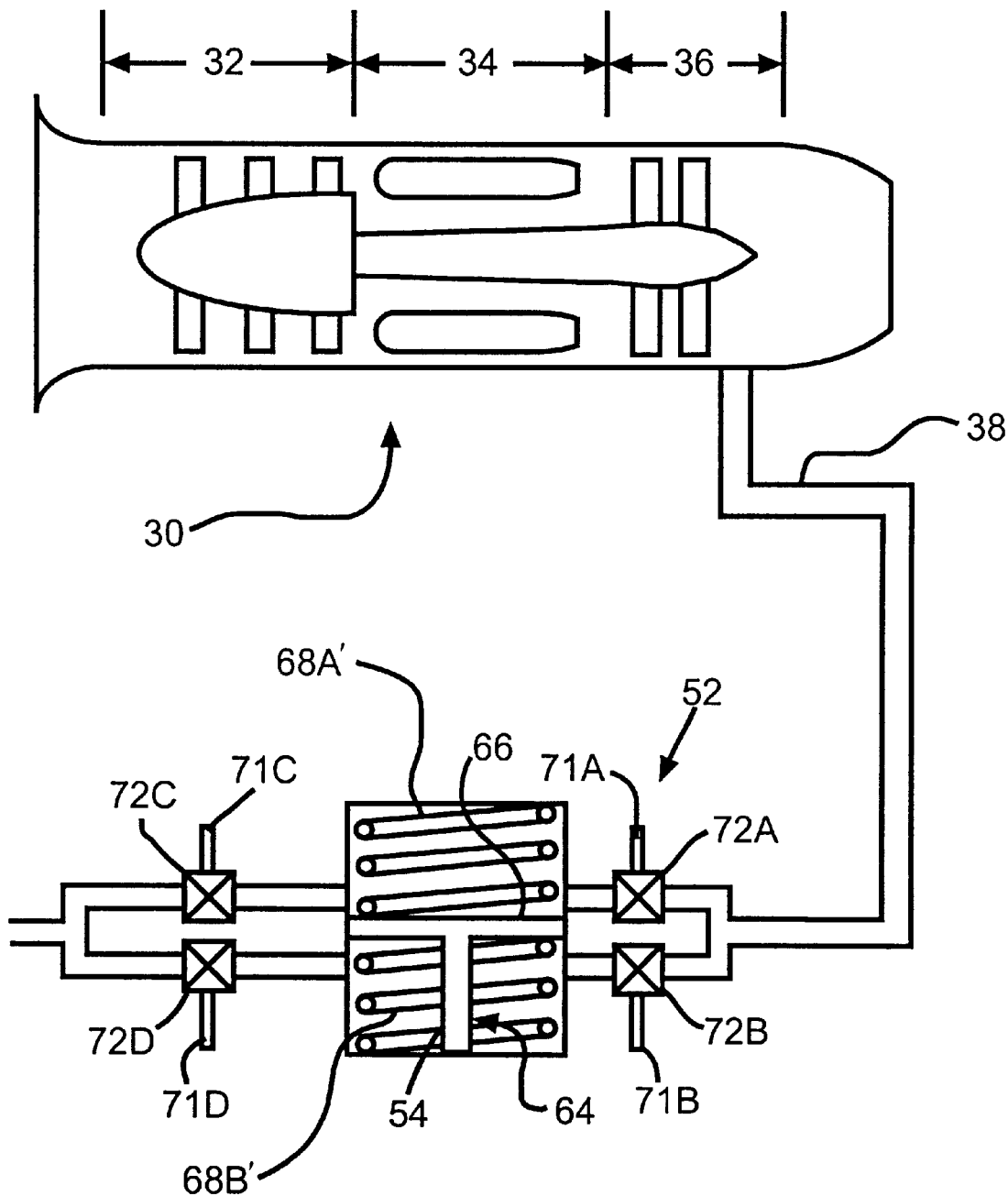
FIG. 3 presents a schematic of the operating elements of an optically controlled SMA actuator using a hot gas flow from a gas turbine engine turbine section to activate the SMA elements.
Figure 4:
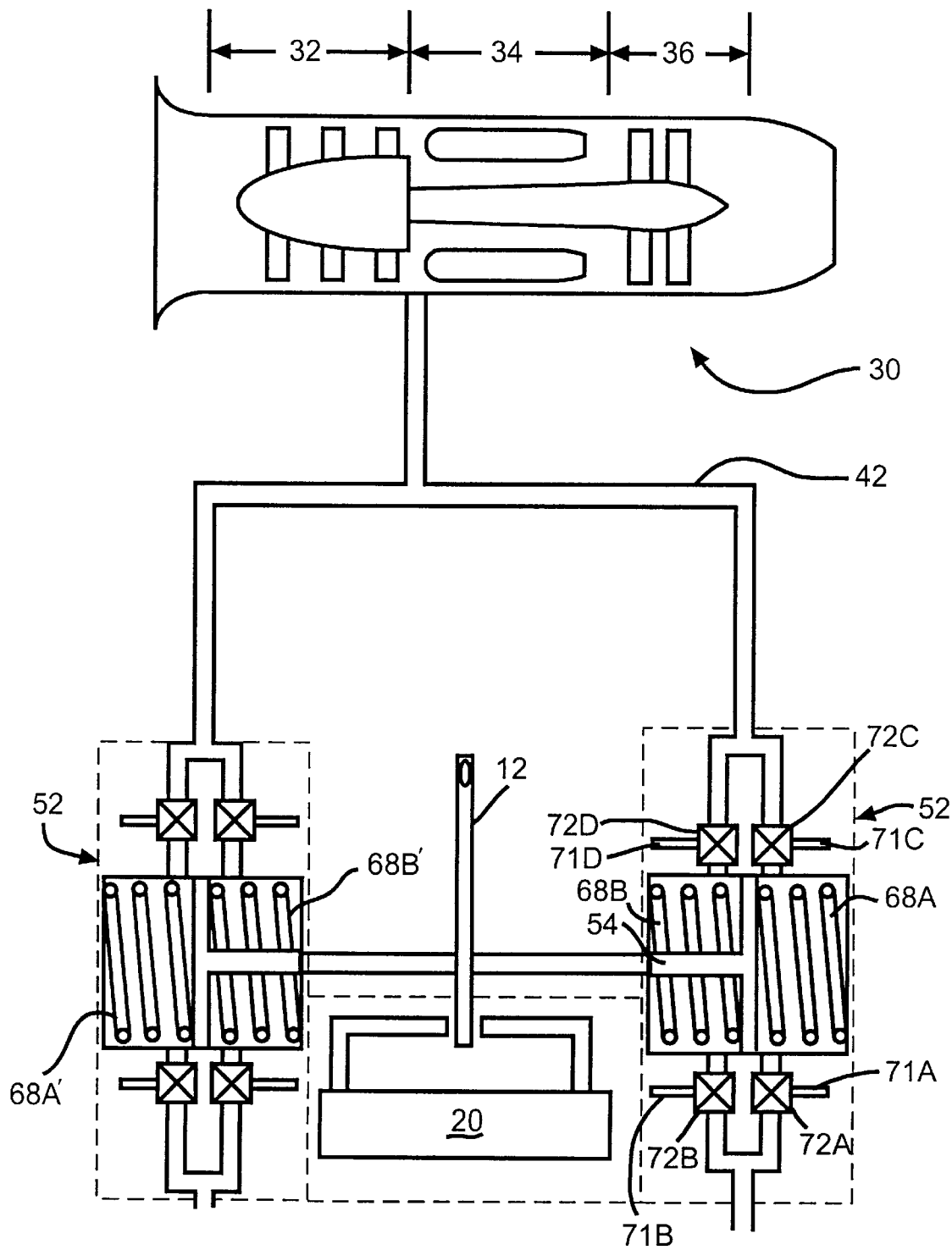
FIG. 4 presents a schematic of a servo valve, similar to that of the prior art, operated by an optically controlled hot gas activated SMA microactuator wherein the hot gas source is from a gas turbine engine compressor section.

Referring now to FIG. 3, actuator 52 is schematicly illustrated in its hot gas embodiment wherein actuator 52 generally comprises an actuator ram assembly 64 including actuator ram 54 and an associated piston 66. Positioned on either side of piston 66 are expandable/retractable shape memory alloy (SMA) elements 68A and 68B. As illustrated, in FIG. 3, piston 66 is in a neutral position with neither SMA element activated. When SMA elements 68A and 68B are selectively heated and/or cooled a force is applied to piston 66 thereby causing actuator ram 54 to extend and/or retract from actuator 52. To extend or retract actuator ram 54 from its otherwise natural position a supply of hot gas is selectively supplied to either side of piston 66 depending upon the desired direction of movement of actuator ram 54. The source of hot gas energy applied to SMA elements 68A and/or 68B of actuator 52 may be supplied by a gas turbine engine 30 selectively controlled by optical switches 72A, 72B, 72C, and 72D as illustrated in FIGS. 3 and 4.

Gas turbine 30 typically comprises a compressor section 32, a combustion section 34, and a turbine and exhaust section 36. As shown in FIG. 3, the hot gas required to operate actuator 52 may be supplied by the turbine section 36 of gas turbine engine 30, particularly in aircraft installations. Hot high pressure gas may be conveniently conducted through conduit 38 from turbine section 36 to optical switches 72A and 72B.

Applying hot gas to SMA element 68A, by opening optical switches 72A and 72C and closing optical switches 72B and 72D, causes hot gas to flow across SMA element 68A thereby causing extension of actuator ram 54, whereas application of hot gas to SMA element 68B by opening optical switches 72B and 72D, and closing optical switches 72A and 72C causes the flow of hot gas over SMA element 68B thereby causing a retraction of actuator ram 54. In FIG. 3 the hot gas source may be on either the left or right side of the figure with the exhaust being on the opposite side.

Optical switches 72A, 72B, 72C, and 72D, are actuated by optical energy received via. optical fiber light pipes 71A, 71B, 71C, and 71D. The optical switches may be of the same SMA construction as micro actuator 64 except that the thermal energy required to activate the SMA elements is delivered by optical energy such as laser energy. The optical energy would thereby be applied directly to the SMA elements. The source of hot gas, for aircraft applications, may be from the compressor 32 or the turbine section 36 of the gas turbine engine 30 as shown in FIGS. 3 and 4. To minimize engine efficiency penalties, the preferable source of hot gas is from the turbine section 36.

In an alternate embodiment the SMA elements 68A and 68B may be activated directly by the application of optical, or laser, energy thereby eliminating the need to route a hot gas from its engine source to a microactuator actuator remote therefrom. Referring again to FIG. 3, in such an alternate embodiment, optical energy may be selectively applied to SMA elements 68A and/or 68B through optical fibers 71 (FIG. 3) connected directly to assembly 64 in place of hot gas inlet and exhaust pipes. The optical energy alternately applied to 68A or 68B through optical fibers 71 will cause the same movement of actuator ram as 54 as in the hot gas embodiment.

A pair of SMA actuator assemblies 52, as illustrated in FIG. 3, may be configured as illustrated in FIG. 4 wherein each respective actuator ram 64, may be configured so as to act directly upon the flapper arm 12 of a micro servo valve assembly 20. In FIG. 4 the source of hot gas, in an aircraft application, may typically, be a gas turbine engine 30 as shown. In FIG. 4 the source of hot gas is shown as being taken from the gas turbine compressor section 32 and conveyed to optical switches 72D and 72C, of actuator assembly 52, through conduit 42.

The SMA elements 68A nd 68B are preferably of a helical configuration, for example as that taught in U.S. Pat. No. 4,984,542 or of any other suitable configuration or structure. FIG. 3 illustrates typical helical SMA elements 68B' and 68A' in actuator 52.

The remaining portion of the micro servo valve assembly 20 functions as that described above and will not be described further in the interest of brevity.

It is evident that many alternatives, modifications, and variations of the present invention will be apparent to those skilled in the art in light of the foregoing teachings. Accordingly, the invention is intended to embrace all such alternatives, modifications and variations as may fall within the spirit and scope of the appended claims.

I claim:

1. A micro actuator energized by hot gas for use in a remotely controlled servo mechanism comprising:

a) means for supplying hot gas;

b) actuating means including at least one shape memory alloy element for actuating said servo mechanism, which includes piston-cylinder means having at least one shape memory alloy element positioned upon one side thereof whereby a force is produced upon said servo mechanism by action of said hot gas upon said shape memory alloy element;

c) means for directing said hot gas to said shape memory alloy element whereby said shape memory element is energized thereby actuating said servo mechanism.

2. The micro actuator as claimed in claim 1 wherein said shape memory element is configured as a helical spring.

3. The micro actuator as claimed in claim 1 wherein a second shape memory alloy element is positioned on the opposite side of said piston.

4. A micro actuator energized by hot gas for use in a remotely controlled servo mechanism comprising:

a) means for supplying hot gas, b) actuating means having a first and second shape memory alloy element for actuating said servo mechanism, whereby actuation of said first shape memory element positions said servo mechanism in a first position and actuation of said second shape memory element positions said shape memory element in a second position, wherein said actuating means includes piston-cylinder means having said first and second shape memory elements positioned upon opposite sides thereof whereby a force may be selectively applied to either side of said piston, c) control means whereby said hot gas may be selectively directed to said first and second shape memory element which includes optically controlled means whereby the flow of said hot gas to said first and second shape memory alloy elements may be independently controlled.

* * * * *